(12) United States Patent
Smith

(10) Patent No.: US 7,411,982 B2
(45) Date of Patent: *Aug. 12, 2008

(54) DIGITAL WIRELESS VOICE AND DATA MODEM

(75) Inventor: Philip Ray Smith, Chimacum, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/831,815

(22) Filed: Jul. 31, 2007

(65) Prior Publication Data

US 2007/0268934 A1 Nov. 22, 2007

Related U.S. Application Data

(63) Continuation of application No. 10/242,169, filed on Sep. 11, 2002, now Pat. No. 7,269,188.

(60) Provisional application No. 60/383,447, filed on May 24, 2002.

(51) Int. Cl.
*H04J 1/00* (2006.01)

(52) U.S. Cl. .................... 370/480; 370/494; 375/222

(58) Field of Classification Search ................. 370/480, 370/352, 494, 493, 522, 338, 349, 465, 527, 370/528; 375/222; 455/556.1, 550.1
See application file for complete search history.

(56) References Cited

U.S. PATENT DOCUMENTS 7,269,188 B2 * 9/2007 Smith ......................... 370/480

\* cited by examiner

*Primary Examiner*—Chi H. Pham
*Assistant Examiner*—Alexander Boakye
(74) *Attorney, Agent, or Firm*—Stolowitz Ford Cowger LLP

(57) ABSTRACT

Simultaneous transmission of voice and data over the voice channel of a digital wireless communications network, such as a "cell phone" network, is reconfigurable on the fly among multiple operating modes, including a lull detection mode in which data is transferred during a lull or quiet period in the voice content. Additionally, control signaling in the voice channel, rather than over a separate control or "overhead" channel is employed to support SVD. The described system operates transparently over any wireless telecommunications system.

20 Claims, 3 Drawing Sheets

DIGITAL WIRELESS VOICE AND DATA MODEM

RELATED APPLICATIONS

This application is a continuation of U.S. application Ser. No. 10/242,169 filed Sep. 11, 2002 (now U.S. Pat. No. 7,269,188), which claims priority to U.S. Provisional Application No. 60/383,447 filed May 24, 2002.

COPYRIGHT NOTICE

© 2002 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

FIELD OF THE INVENTION

The invention pertains to communications of voice and data over a single voice channel of a digital wireless communication network.

BACKGROUND OF THE INVENTION

It is known to send both voice and data over various types of communications channels. Several methods are known for sending data over the control channels of a wireless telecommunications network. One example is the standard IS-41 signaling over the control channel. Other known messaging services include SMS or Short Message Service which allows up to 160 characters to be sent over the air from base stations to cell phones, pagers or other handheld wireless devices, again operating separately from the voice channel. WAP or Wireless Application Protocol is a carrier-independent, transaction oriented protocol for wireless data networks. It is currently being implemented in various wireless devices to enable interactive sessions using "mini-web pages" or the like. One cannot simultaneously carry on a conversation over the same channel. Thus a WAP session is not a voice channel connection.

Others have attempted to insert data in the form of audio tones—similar to a conventional telephone modem—into the voice channel of a wireless session. One problem is that such tones are audible, and therefore they interfere with the voice conversation. One known solution to that interference calls for essentially turning off the voice connection, e.g., the microphone and speaker, at predetermined intervals, and transmitting data over the voice channel during that brief interval. This approach is aptly called "blank and burst." Up to a few hundred milliseconds of "blank and burst" at a time may go unnoticed by the caller, but the amount of data that can be transferred over that interval is quite limited, due to the limited frequency response and corresponding bandwidth of the channel.

Another approach is to carve a "notch" in the voice channel frequency spectrum, and modulate the data for insertion into the notch of frequencies no longer occupied by voice content. Of course, voice fidelity is compromised, and again bandwidth of data transmission is severely limited. This notch filter technology was described by Bruno, et al., in PCT Publication No. WO 96/18275 which corresponds to U.S. Pat. No. 6,226,529. It also appears in U.S. Pat. No. 6,140,956 to Hillman, et al. Both of these U.S. patents are incorporated herein by this reference.

SUMMARY OF THE INVENTION

The present invention improves on prior art wireless communications by providing several new features and advantages. Briefly, it provides a communications system and method that employs lull detection to determine when voice content is not occupying the voice channel, and takes that opportunity to instead transmit data over the voice channel. In this way, data can be sent simultaneously without noticeably interfering with the voice conversation.

Further, special tones can be sent over the voice channel to provide control signals, whereas in prior art control signaling occurs via a separate control channel. This makes control signaling independent of the particular wireless carrier or type of wireless network in use, as it does not depend on the overhead channel. Further, "embedded signaling" as described herein is transparent to the wireless service provider so that it cannot, for example, impose extra charges for transmission of data.

Moreover, the present invention—comprising an SVD modem system—implements multiple modes of operation, and enables switching among various modes of operation "on the fly" responsive to current circumstances. These modes of operation can include: (1) data burst with reduced voice spectrum and automatic lull detection; (2) data burst with blanking of voice and automatic lull detection; and (3) continuous voice and data with spectrum sharing.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 6:
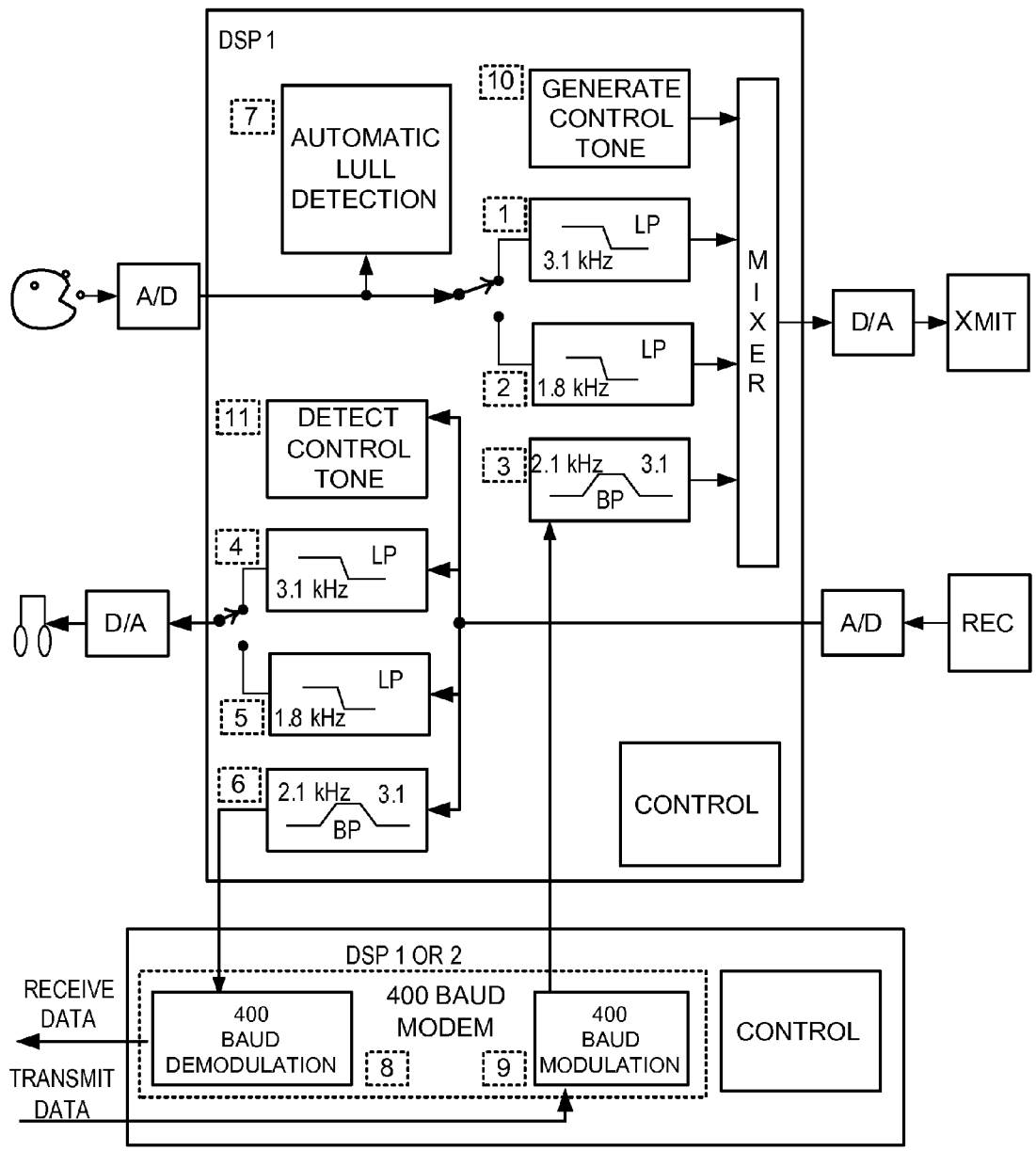
FIG. 6 is a simplified block diagram of one implementation of a modem for simultaneous transmission of voice and data over a single voice channel of a telecommunication system.

Referring now to FIG. 6, it depicts the basic components of the SVD modem (the mobile cell unit and the base station, in the case of a cell phone application, will each have a SVD modem). First, a brief description of each of the major blocks is given. Then a description is given of how the blocks can be combined to support various modes of sending voice and data.

Transmitted Voice Low Pass (LP) filters (blocks 1 & 2) in FIG. 6: These filters act to band limit the voice signal before being mixed with other signals. Either the 3.1 kHz or 1.8 kHz filter is used depending on the needed configuration.

400 Baud Modulation (Transmit) Band Pass filter (block 3): This filter band limits the outgoing 400 baud modem signal to between 2.1 and 3.1 kHz.

Received Voice Low Pass filters (block 4 & 5): This filter band limits the incoming voice signal to either 3.1 kHz or 1.8 kHz depending on the needed configuration.

400 Baud Demodulation (Receive) Band Pass filter (block 6): This filter band limits the incoming 400 baud modem signal to between 2.1 and 3.1 kHz.

Automatic Lull Detector (block 7): This block detects when there is a lull in the conversation so data can be transmitted. This is used only in certain configurations. Lull detection is conveniently implemented in DSP software.

400 Baud Modem (blocks 8 & 9): These blocks perform the function of modulation and demodulation of the 400 baud modem signal. Further details of in-band signaling modems are shown in commonly-assigned U.S. Pat. Nos. 6,144,336 and 6,690,681, both incorporated herein by this reference.

Generate Control Tone (block 10): This block generates a 3.4 kHz tone that is mixed with the voice and modem signal that are transmitted. For certain configurations, this signal is used at the receiving end as an indication that a data packet is coming. This control tone is not heard by the user.

Detect Control Tone (block 11): This block detects a received 3.4 kHz control tone. It's used to notify the receiving system, for certain configurations, that it needs to reconfigure its self for the forthcoming data package.

Simultaneous Voice and Data Modes

Figure 1:
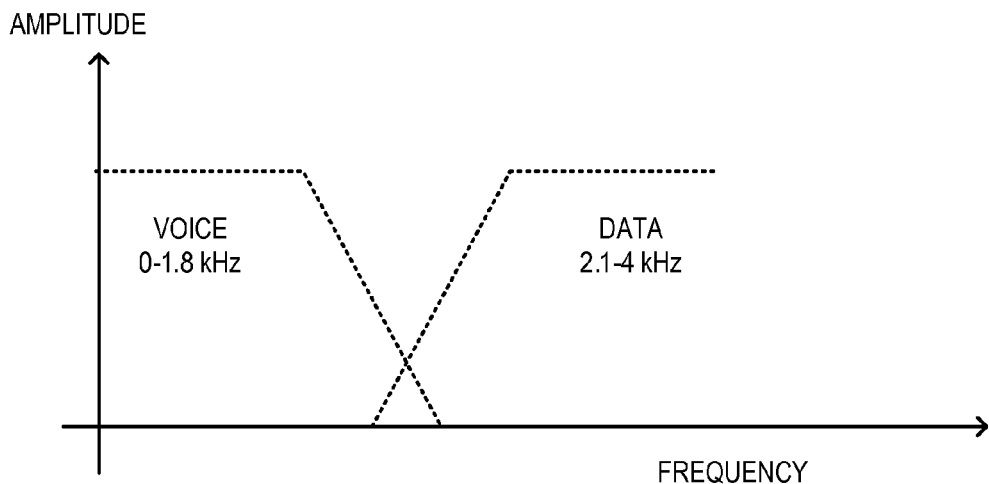
FIG. 1 is a frequency plot illustrating a reduced voice spectrum for use with simultaneous data transmission.

The blocks described above can be combined to operate in a number of different modes:
1. Continuous voice and data
2. Data burst with reduced voice spectrum and automatic lull detection
3. Data burst with blanking of voice and automatic lull detection
4. Miscellaneous Continuous Voice and Data In this mode the voice and data can be continuously and independently transmitted. The voice occupies one band and the data another as shown in FIG. 1. By reducing the spectrum that the voice occupies, the voice is still clearly understood and sounds like a voice coming out of a home sound system with the treble turned up a bit. For this mode, the blocks need to be connected so the outgoing voice is always filtered by the 1.8 kHz Low Pass filter, the outgoing 400 baud signal (from the modulator) is always filtered by the 2.1/3.1 kHz Band Pass filter, the incoming voice is always filtered by a 1.8 kHz Low Pass filter, and the incoming 400 baud signal (that goes to the demodulator) is always filtered by a 2.1/3.1 kHz Band Pass filter. The following blocks are not used: Automatic Lull Detect, Generate Control Tone, and Detect Control Tone.

Data Burst with Reduced Voice Spectrum and Automatic Lull Detection

Figure 2:
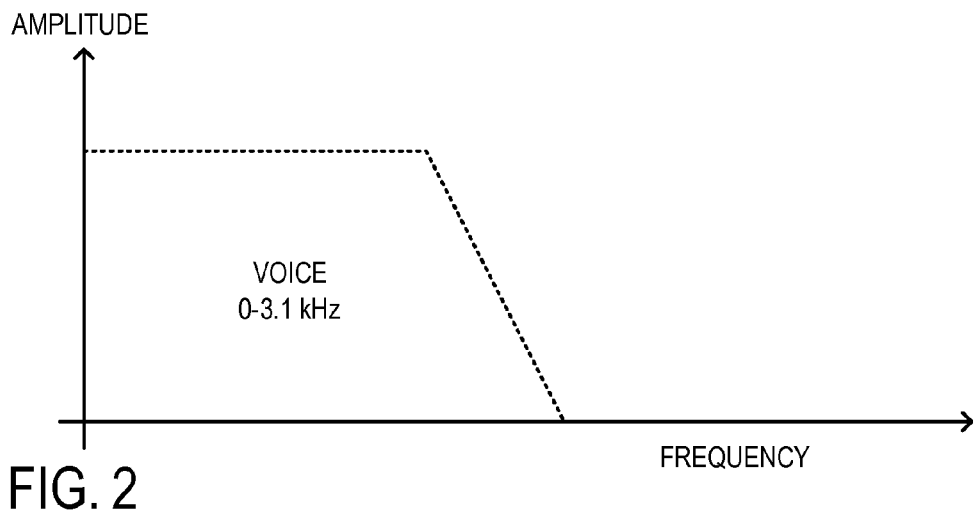
FIG. 2 is a frequency plot illustrating a full-spectrum voice channel.

In this mode, the Automatic Lull Detection block monitors the voice signal for lulls. In a presently preferred embodiment, a silent period of about 400 msec is considered a lull. When a lull is detected, data from the 400 baud modulation block is transmitted. When there is no data being transmitted, the voice signal is connected to the 3.1 kHz LP filter resulting in a spectrum as shown in FIG. 2.

Figure 3:
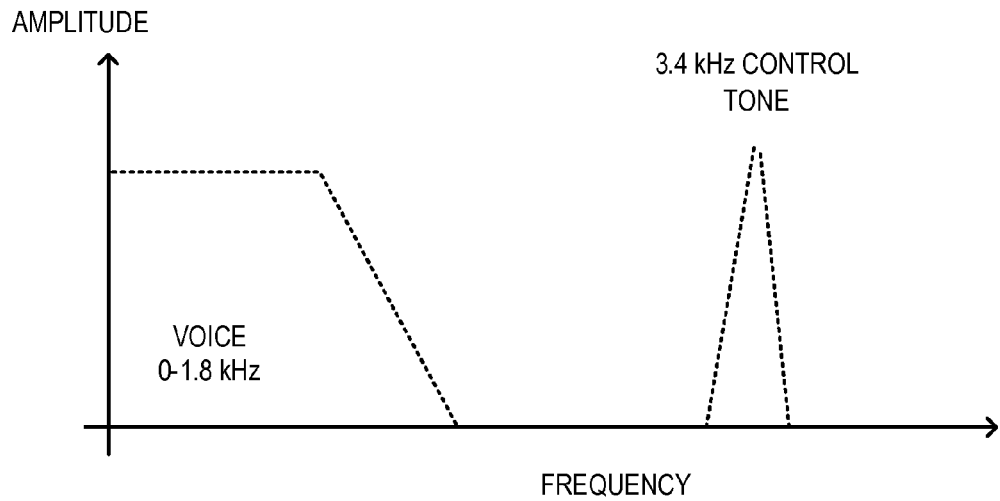
FIG. 3 is a frequency plot illustrating a reduced voice spectrum and simultaneous control tone.
Figure 4:
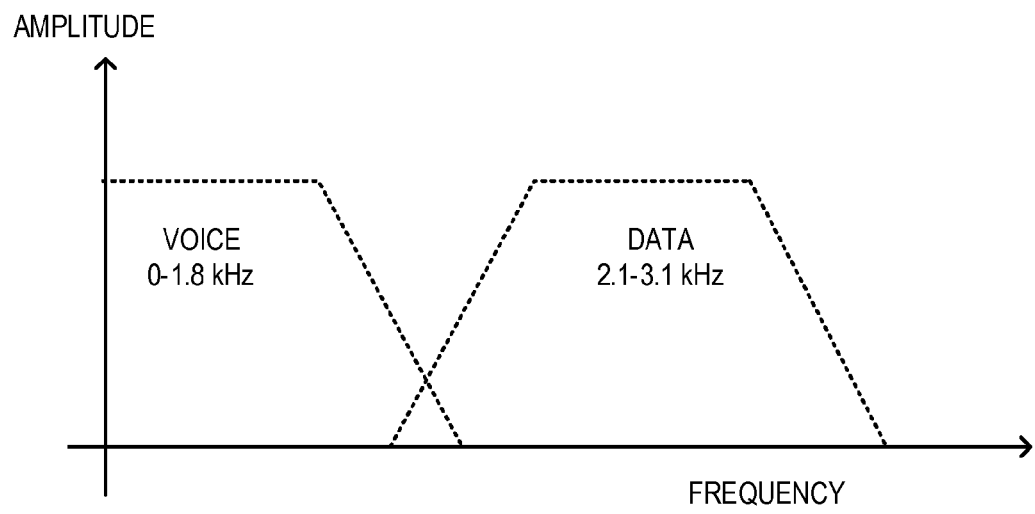
FIG. 4 is a frequency plot illustrating reduced voice spectrum together with a data band within the audio frequency range.

When data is transmitted, the voice signal is connected to the 1.8 kHz LP filter and mixed with the Control Tone and the filtered 400 baud modulated signal in the following way. For a brief time the reduced voice spectrum and control tone are present (FIG. 3) followed by a period when the voice (with reduced spectrum) and data are present (FIG. 4).

Figure 5:
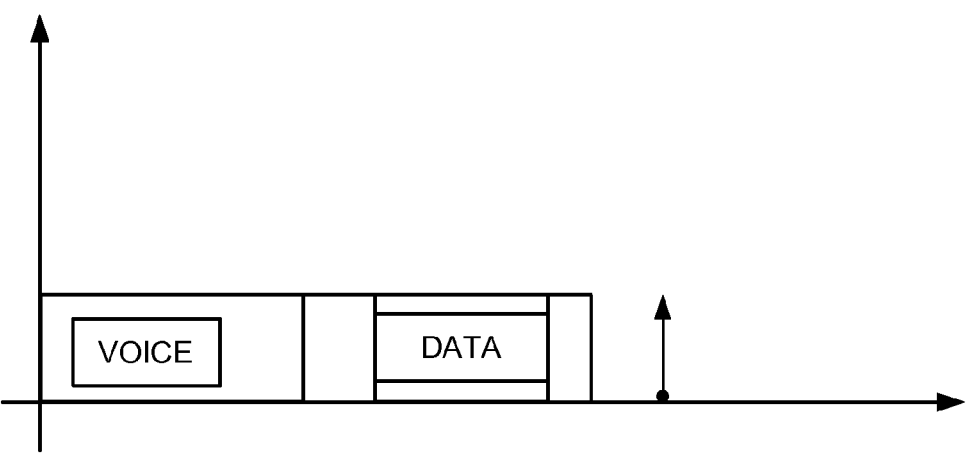
FIG. 5 is a frequency plot illustrating a reduced voice band, data band and signaling tone all within the audio frequency spectrum.

At the other end where the signal is received, the system is always looking for the control tone. When the control tone is detected, it knows that the voice will be reduced in spectrum and a data packet, occupying a band from 2.1 kHz to 3.1 kHz, will be forthcoming and reconfigures its self accordingly. The receiving system filters the voice with a 1.8 kHz LP filter and the incoming modem signal with a 2.1/3.1 kHz BP filter. The voice signal is then sent to the speaker/headset and the modem signal (data) is sent to 400 baud demodulator. The Control Tone and data packets are handled in such a way that they are not heard. FIG. 5 is a frequency plot illustrating a reduced voice band, data band and signaling tone all within the audio frequency spectrum.

Data Burst with Blanking of Voice and Automatic Lull Detection

This mode is similar to the one just described above ('data burst with reduced voice spectrum and automatic lull detection') except, instead of being reduced in spectrum, the voice is totally eliminated during the time that data is sent, in other words for the duration of the data packet.

Other modes

The functional blocks described above can be combined to support other modes as required. For instance, transmissions from the mobile unit (usually the customer) to the base station (usually the service provider) could be sent while in the 'continuous voice and data' mode, and transmissions in the other direction could be sent in the 'data burst with reduced voice spectrum and automatic lull detection' mode. The call taker at the base station would hear a voice with a reduced spectrum and the caller on the mobile unit would hear a full spectrum voice unless data was being sent. The call taker could occasionally speak with a slight, really unnoticeable, pause between words so that data could be sent to the mobile unit (during those pauses). In this case, the caller on the mobile unit would not hear the data being sent and would always hear the full spectrum of the call taker.

Another illustrative mode of operation is to send data as in the 'data burst with blanking and automatic lull detection' mode except, instead of using the automatic lull detector and sending the packet during lulls, the data could be sent at fixed intervals (the 3.5 kHz control tone would still precede the data and the voice would still be blanked during the time data is sent). Thus the invention provides for multiple-mode operation with dynamic reconfiguration.

In accordance with presently preferred embodiments, the data can be buffered. The modem can also be configured to transmit a pending packet even if a lull in the voice input doesn't occur within a predetermined amount of time. This feature ensures that important data can be sent even if a lull does not occur within the selected time period. How often a lull occurs is entirely dependent upon the speaker. Some people naturally pause frequently while speaking, while others may talk almost continuously. We have found that in a typical conversation there will be lulls about 50% of the time.

The timing on the lull detector is not critical within reasonable bounds. Waiting too long wastes bandwidth otherwise available for data transmission. Too short a lull detector will degrade speech quality by frequently switching in and out of the simultaneous transmission mode in which voice is band-limited. In a presently preferred implementation, 400 msec is a useful lull period to trigger a mode switch.

A presently preferred packet size is relatively small, about 250 msec at most. In one embodiment, using a nominal 400 baud modem, this translates to about 6 bytes net. More bytes could be sent in the same time frame if packet overhead were reduced. The exact size of the packet preferably is configurable to accommodate various applications. For voice dominant applications, for example, the packet will be short. For data dominant applications they can be longer.

In one embodiment, once data transmission is started, it proceeds until a complete data packet is sent. Complete packets can be arranged to enable error detection. Once transmission is complete, the modem modes and filters can be switched to whatever configuration may be needed. Thus the system can dynamically reconfigure, as described above, with packet granularity, to accommodate changing voice and data requirements.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A method of substantially simultaneous transmission of voice content and data over a single voice channel of a digital wireless telecommunications system, a voice channel call being established between first and second stations, and the method comprising the steps of:
    partitioning the voice channel so as to comprise at least two logical bands, including a voice band and a control band, all within the audio range of frequencies;
    transmitting voice content from the first station to the second station over the voice band of the voice channel;
    while transmitting voice content, monitoring the voice content to detect a lull; and
    responsive to detecting a lull in the voice content, transmitting a control tone in the control band of the voice channel to signal the second station to receive data;
    and then sending data to the second station while continuing to simultaneously transmit voice content over the voice band of the voice channel.

2. A method according to claim 1 and wherein said transmitting voice content includes limiting the voice spectrum to frequencies below a predetermined maximum frequency so as to allow data transmission over the voice channel using frequencies greater than the voice spectrum maximum frequency.

3. A method according to claim 1 and further comprising:
    controllably switching the voice band between a first configuration that is band limited to frequencies up to approximately a first predetermined audio frequency while data is not being transmitted, and a second configuration that is band limited to frequencies up to approximately a second predetermined audio frequency, the second frequency being lower than the first frequency, for use during a lull in voice content when data is being transmitted, thereby reducing the voice spectrum of the transmitted signal while data is being transmitted.

4. A method of simultaneous transmission according to claim 3 and wherein the first predetermined audio frequency is approximately 3.1 kHz.

5. A method of simultaneous transmission according to claim 3 and wherein the second predetermined audio frequency is approximately 1.8 kHz.

6. A method of simultaneous transmission according to claim 3 and wherein said switching the voice band configuration includes selecting a corresponding low-pass filter.

7. A method according to claim 1 wherein the control tone has a selected frequency greater than approximately 3.1 kHz.

8. A method of simultaneous transmission according to claim 1 and wherein said sending data step comprises transmitting a complete data packet.

9. A method of transmission of voice content and data over a single voice channel of a digital wireless telecommunications system, a voice channel call being established between first and second stations, and the method comprising the steps of:
    transmitting voice content from the first station to the second station over the voice channel;
    transmitting a control signal to the second station over the voice channel to signal beginning transmission of data over the voice channel;
    after transmitting the control signal, reducing a frequency spectrum of the transmitted voice content; and
    while continuing to transmit voice content within the reduced frequency spectrum, commencing simultaneous transmission of data to the second station over the same voice channel.

10. A method according to claim 9 wherein:
    said transmitting voice content from the first station within the reduced frequency spectrum includes filtering the voice content by means of a first low-pass filter prior to transmission.

11. A method according to claim 9 wherein the control signal is transmitted periodically at a predetermined time interval, so that data is transmitted to the second station periodically at the same predetermined time interval.

12. A method according to claim 9 wherein the control signal is transmitted responsive to detecting a lull in the voice content originating at the first station.

13. A method according to claim 9 and wherein said transmitting a control signal includes mixing a predetermined audio frequency control tone together with the voice content and the data for transmission of all three said components over the single voice channel.

14. A method according to claim 9 and wherein the control signal comprises a control tone having a selected frequency greater than approximately 3.1 kHz.

15. A method according to claim 9 and wherein the control signal comprises a control tone having a selected frequency of approximately 3.4 kHz.

16. An asymmetrical method of transmission of voice content and data over a single voice channel of a digital wireless telecommunications system, a voice channel call being established between first and second stations, and the method comprising the steps of:
    transmitting first voice content from the first station to the second station over the voice channel;
    while continuing to transmit first voice content, commencing simultaneous transmission of first data to the second station over the same voice channel;
    transmitting second voice content from the second station to the first station over the voice channel;
    blanking the said transmission of second voice content; and
    while the said transmission of second voice content is blanked, transmitting a burst of second data from the second station to the first station over the same voice channel.

17. A method according to claim 16 and further comprising:
    transmitting a control signal to the second station over the voice channel to signal beginning transmission of the first data over the voice channel.

18. A method according to claim 16 wherein the first station is a mobile station.

19. A method according to claim 16 and further comprising:
    transmitting a control signal from the first station to the second station over the voice channel to request a change in the mode of operation of the call.

20. A method according to claim 16 wherein the control signal comprises a control tone having a selected frequency greater than approximately 3.1 kHz.

* * * * *